Oct. 5, 1965  R. W. BROWN ETAL  3,209,628
AUTOMATIC THREAD CHASING MECHANISM
Filed June 5, 1963  7 Sheets-Sheet 1 fig.1.

INVENTORS
ROGER W. BROWN
STEWART G. MOSS
PETER P. MATTHEWS

Blair & Buckles
ATTORNEYS

Fig. 3.

INVENTORS
ROGER W. BROWN
STEWART G. MOSS
PETER P. MATTHEWS
BY Blair & Buckles
ATTORNEYS

United States Patent Office 3,209,628
Patented Oct. 5, 1965

3,209,628
AUTOMATIC THREAD CHASING MECHANISM
Roger W. Brown, Windsor, Stewart G. Moss, Reading, and Peter P. Matthews, Windsor, Vt., assignors, by mesne assignments, to PneumoDynamics Corporation, Cleveland, Ohio, a corporation of Delaware
Filed June 5, 1963, Ser. No. 285,808
8 Claims. (Cl. 82—5)

This invention relates to an automatic thread cutting mechanism and more particularly to an automatic recycling chasing attachment to be mounted on the cross slide of an automatic lathe. The invention achieves automatic thread chasing along an extended length of a workpiece, employing a multiple cutting stroke of a thread chasing tool.

Conventional automatic lathe thread cutting techniques, such as the rolling of threads, produce short threaded lengths on short workpieces, but these techniques are not well adapted for producing long threaded sections on workpieces. The high forces involved in rolling threads limit the lengths of rolled thread to one and one-half inches at most. Thread chasing—the repeated shaving of a slight thickness of material from the work by the cutting tool in numerous cutting strokes down the length of the thread—provides far greater accuracy and much finer threads. Pitch and helical accuracy of the chased thread, as well as diameter tolerances, require precise timing and phase synchronization of the axial traversing of the cutting tool during its successive cutting strokes. The proper phase synchronization must be initiated and maintained throughout the cutting operation. The chasing tool must also be withdrawn, returned and indexed for the next cutting stroke with speed and precision. Indexing of the cutting tool at the beginning of the cutting stroke must be accurate, and overtravel of the indexing tool, causing it to dig or gouge the work at the beginning of its cutting stroke, must be avoided.

The present invention achieves all of the desired speed, accuracy and precision, while offering the advantages of a fully automatic chasing operation on the infeeding cross slide of an automatic lathe. The chasing attachments of the present invention are adapted to cut both right-hand and left-hand threads through a simplified conversion feature. Overrunning of the thread cutting tool is avoided by automatic limit cams; a pneumatic quick return assembly enhances the speed of the chasing operation and is likewise provided with foolproof fail-safe limit cams preventing cutting engagement of the chasing tool with the workpiece during quick return traversing of the tool.

Accordingly, a principal object of the present invention is to provide a thread chasing attachment for automatic lathes providing automatic chasing of elongated workpieces to provide extended threaded lengths thereof.

A further object of the invention is to provide automatic chasing attachments for high precision chasing of threads while producing a maximum number of workpieces per hour by high speed chasing operations.

Another object of the invention is to provide a chasing attachment incorporating positive high precision indexing of the chasing tool into cutting position at the beginning of its cutting stroke, and high precision phase synchronization of the axially moving chasing tool with the rotating workpiece.

A further object of the invention is to provide thread chasing attachments automatically avoiding overtravel of the tool in both the radial and axial direction of its travel relative to the workpiece.

Another object of the invention is to provide thread chasing attachments incorporating speedy pneumatic quick return mechanisms for recycling the chasing tool in continuous chasing operations.

A further object of the invention is to provide thread chasing attachments capable of chasing both right-hand and left-hand threads with at minimum of conversion disassembly labor and machine downtime.

Another object of the invention is to provide thread chasing attachments of the above character incorporating foolproof limit actuating devices to disengage the tool from the workpiece at all times except during the chasing stroke, thereby protecting the workpiece from accidental damage.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
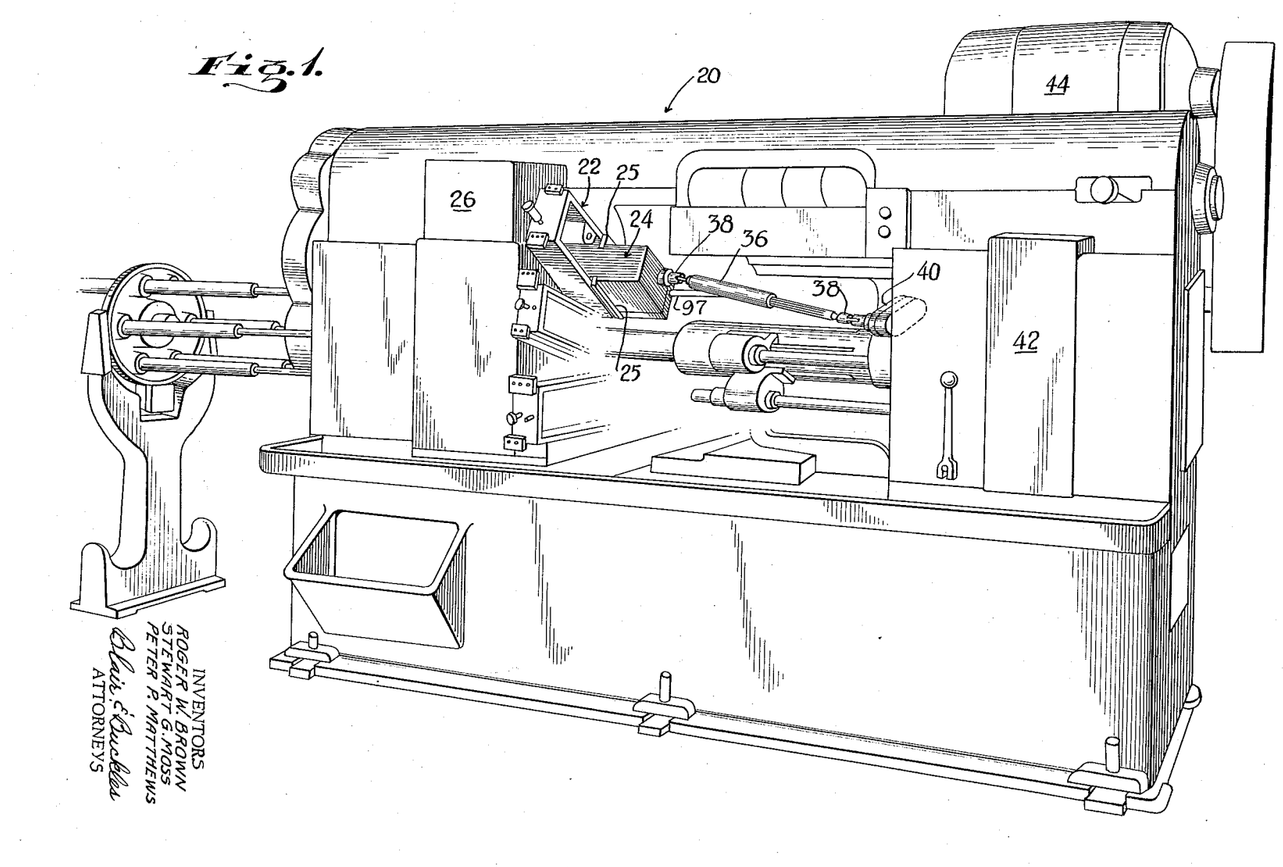
FIGURE 1 is a front perspective elevation view showing an automatic lathe incorporating the present invention.

As shown in FIGURE 1, the thread chasing attachments of this invention are adapted for mounting on the cross slide of an automatic lathe such as the six-spindle machine 20, carrying on its "number four" cross slide 22 the thread chasing attachment generally indicated at 24, held in position on cross slide 22 by clamp members 25

Figure 6:
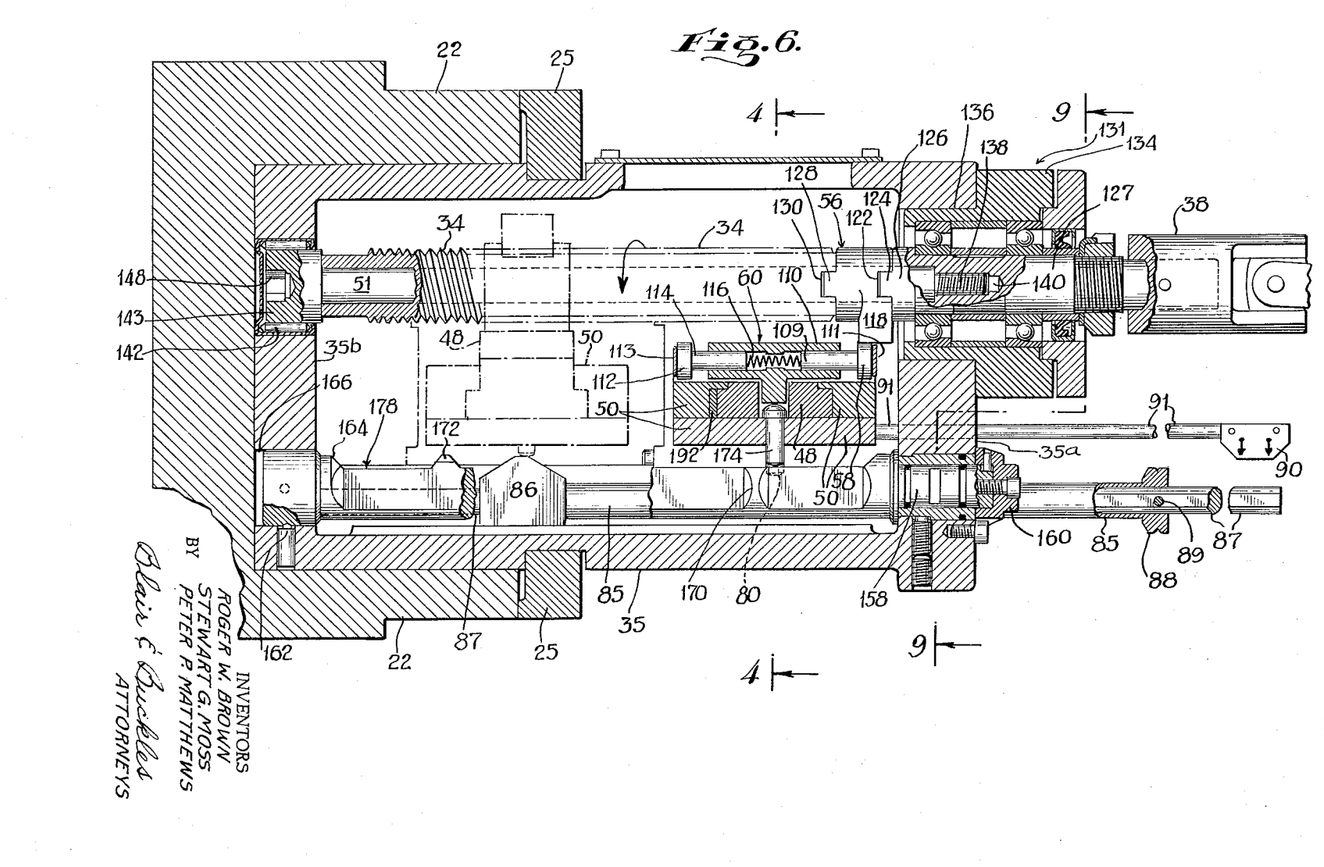
FIGURE 6 is a sectional elevation view showing the chasing tool slide in its indexed cutting position, taken along the line 6—6 in FIGURE 5.
Figures 8, 9, 10:
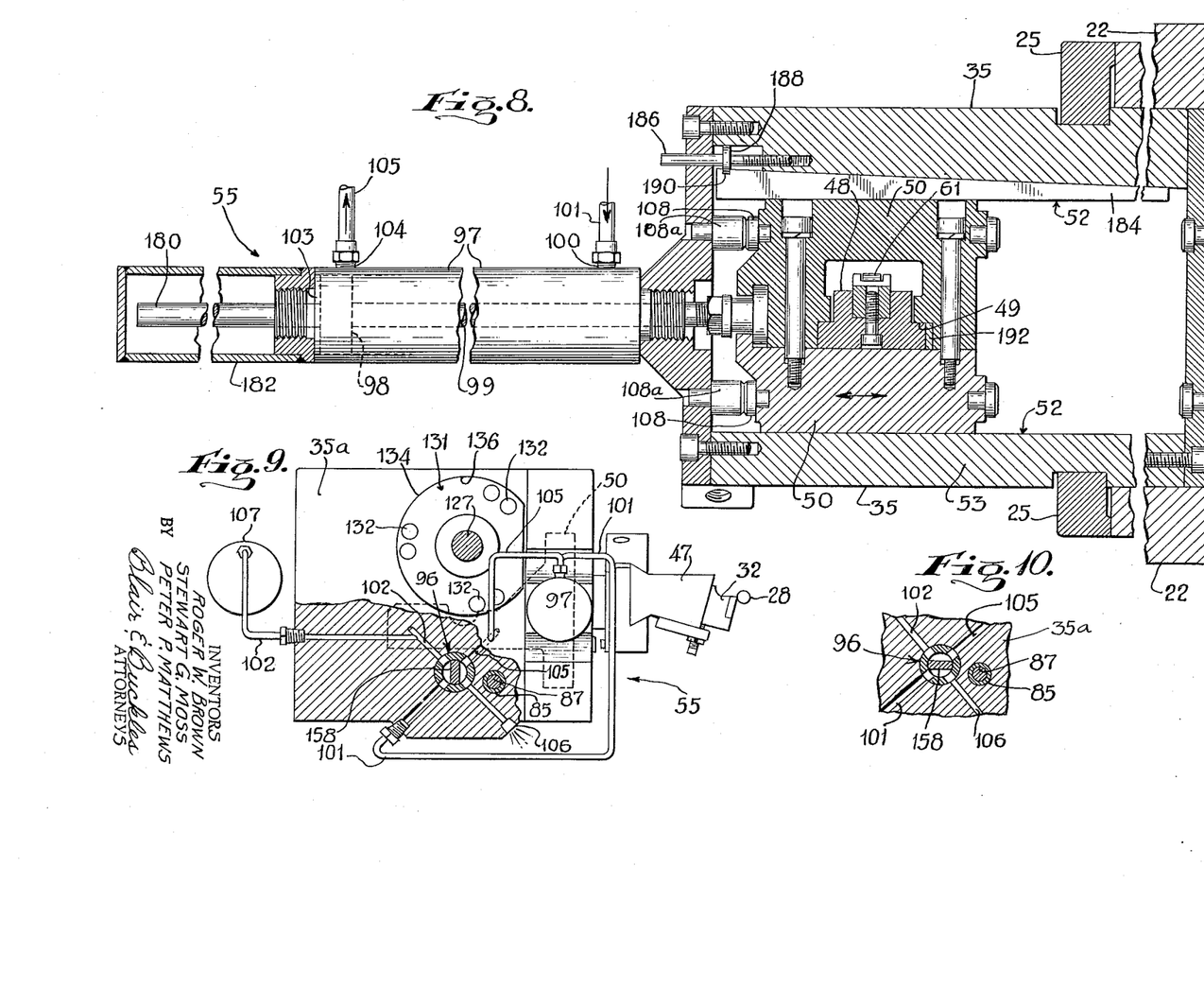
FIGURE 8 is a sectional elevation view of the device shown in FIGURE 6, taken along the line 8—8 in FIGURE 5 and looking from the workpiece toward the attachment, showing the thread chasing tool-carrying mechanism in its indexed position at the beginning of its cutting stroke.
FIGURE 9 is an end elevation view, partly in section, taken along the line 9—9 in FIGURE 6 and showing the pneumatic control valve governing the return stroke of the thread chasing tool.
FIGURE 10 is a fragmentary sectional end elevation view, taken along the line 10—10 in FIGURE 7, and showing the control valve of FIGURE 9 in its alternate position.

(FIGURES 6, 8). The cross slide 22 is driven by cams mounted inside the front column 26 to provide slow, steady radial feed motion of the cross slide-mounted chasing attachment 24 toward the axis of the workpiece 28 (FIGURES 2, 4), mounted in the spindle collet 30 (FIGURE 2) for continuous rotation throughout the chasing operation.

Figure 2:
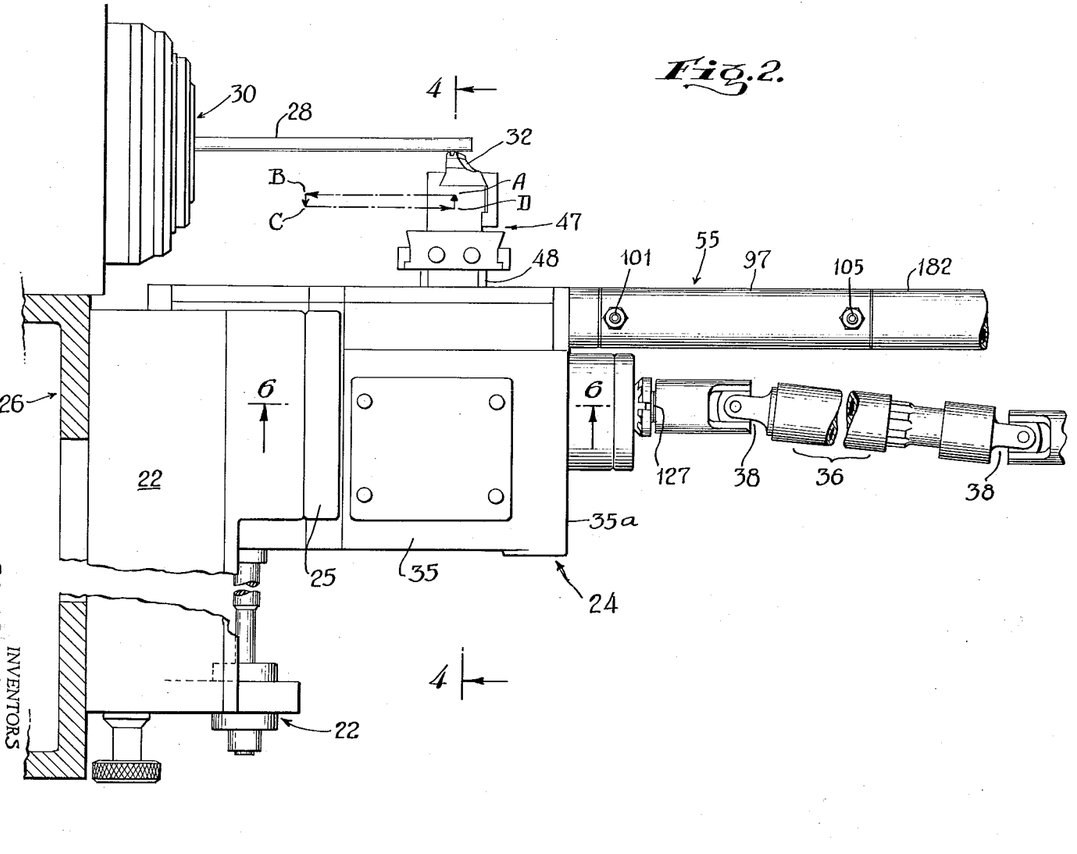
FIGURE 2 is a fragmentary top view of a portion of the machine shown in FIGURE 1, illustrating a thread chasing attachment incorporating the present invention.
Figure 3:
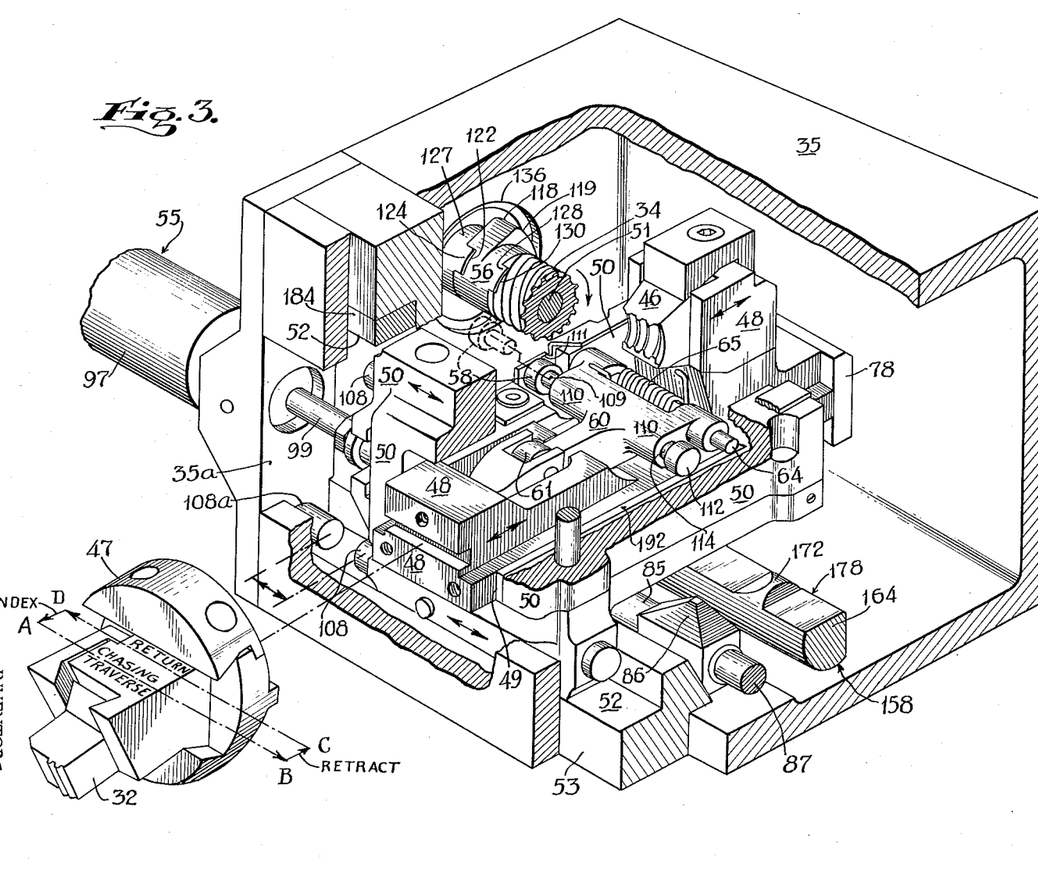
FIGURE 3 is an enlarged perspective view, partially broken away, showing the principal moving parts of the thread chasing attachment of FIGURE 2.

As indicated by the "counter clockwise" substantially rectangular path represented by the rectangle ABCD in FIGURE 2, the chasing tool 32 begins its chasing cycle at the point A and traverses leftward to point B during its "chasing stroke." The speed of the tool's lateral motion from A to B, parallel to the longitudinal axis of the workpiece 28, is governed by a continuously rotating lead screw 34, shown in FIGURE 3, rotatably mounted inside the attachment casing 35, journaled in end walls 35a and 35b thereof, and driven in synchronism with the rotation of the workpiece 28.

The lead screw 34 is powered through a canted splined extensible drive shaft 36, shown in FIGURES 1 and 2, which is connected through universal joints 38 to a reduction gear box 40 (FIGURE 1) mounted on the right-hand column 42 and powered by a main drive motor 44 through the main gear drive train (not shown) of the lathe 20 inside of the right-hand column 42.

*Tool supporting assembly*

Figure 4:
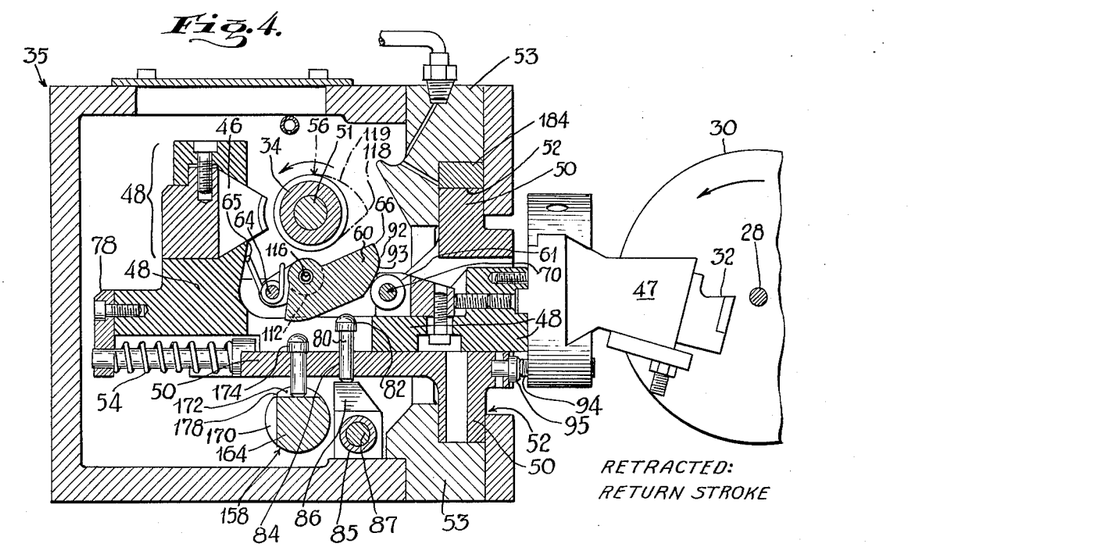
FIGURES 4 and 5 are sectional end elevation views taken along the line 4—4 in FIGURE 2, respectively showing the thread chasing tool in its retracted position between chasing strokes, and in its indexed or chasing position, at the beginning of the chasing stroke.

The principal moving parts of the chasing attachment 24 which produce the cycling motion of the chasing tool 32 (FIGURE 2) in the substantially rectangular path ABCD are shown in FIGURE 3. The chasing tool 32 is driven transversely along the line AB by lead screw 34 via a nut segment 46 engaged therewith and described below. The tool 32 is held in tool clamp 47, and the clamp 47 and nut segment 46 are both mounted on a tool slide 48, which is slidable toward and away from the workpiece 28 in ways 49 formed in a slideway 50 (FIGURES 3, 4 and 8). Thus the tool 32 can move forward into "indexed" or chasing engagement with workpiece 28 (FIGURE 5), and backward to a "retracted" or disengaged position (FIGURE 4).

Figure 5:
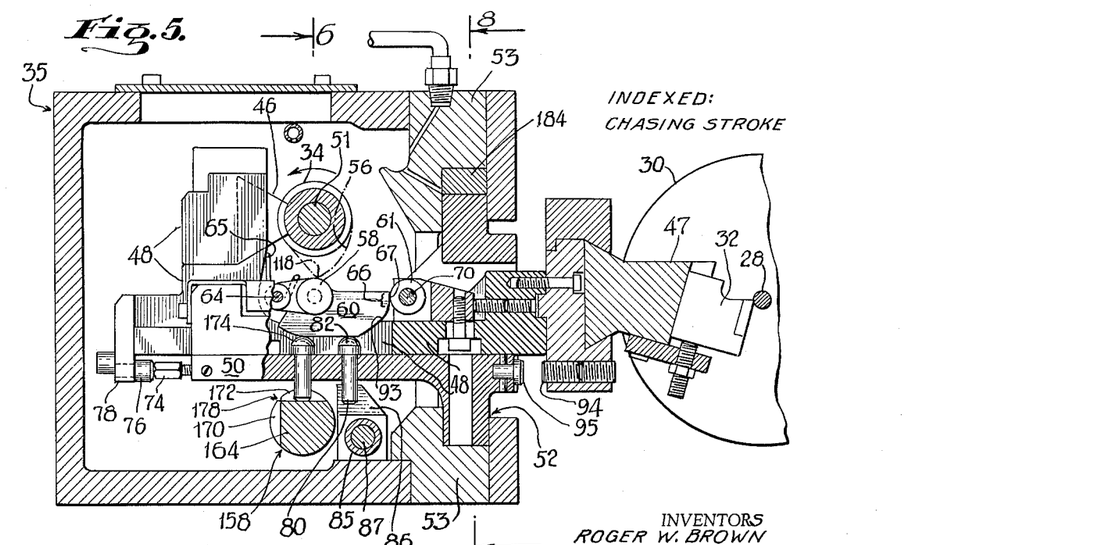

The chasing or cutting stroke from point A to point B substantially parallel to the axis of the workpiece 28 is produced by lateral translation of the lead screw nut segment 46, caused by its engagement with the rotating lead screw 34 in the indexed position of FIGURE 5. The tubular lead screw 34 is telescopingly mounted on a driven index shaft 51 (FIGURES 3 and 6); thus rotation of the lead screw and shaft moves the engaged nut segment 46 laterally to move the tool slide 48, which is directly joined thereto, and with it slideway 50 as well.

Slideway 50 is mounted for lateral motion, parallel to the axis of the workpiece 28, in ways 52 formed in a guide base 53, forming a portion of the attachment casing 35 (FIGURES 3, 4 and 8). This lateral movement, caused by driving engagement of nut segment 46 with lead screw 34, produces the lateral traversing of the chasing tool 32 along the workpiece 28 during the chasing stroke from A to B (FIGURE 2).

When the tool slideway 50 reaches the end of its chasing stroke at point B, the tool slide 48 is retracted from the workpiece 28, following the line BC in FIGURE 2, under the positive urging of a heavy compression spring 54, FIGURE 4, compressed between tool slide 48 and slideway 50.

The tool slideway 50 is then free for its return from the retracted position C to its ready position D (FIGURE 2). The tool 32 and its supporting assembly are immediately returned to the ready position D along the line CD through the action of a pneumatic return assembly 55, best shown in FIGURES 8, 9 and 10.

The cross slide 22 advances continuously toward workpiece 28 throughout the chasing cycle ABCD. Thus after its return stroke, the next indexing of tool 32 brings it into cutting position already advanced in feed to the desired depth of the next cut by the continuous feed of cross slide 22.

When the tool slideway 50 reaches the end of its return stroke, with the tool at ready position D, an indexing cam 56 (FIGURES 3, 4 and 5) keyed to rotate with the lead screw 34 engages a follower 58 (FIGURES 3 and 5), mounted directly below the index cam 56 on a latch cam 60, causing pivotal downward movement of latch cam 60 into the position shown in FIGURES 3 and 5. This movement of latch cam 60 urges a rotatable follower roller 61 supported on tool slide 48 forward, indexing the tool slide 48 and its tool 32 forward with precision into its cutting position for the ensuing chasing stroke, which thus begins at a predetermined synchronized point in the rotation of workpiece 28.

The tool slide 48 is shown in its two positions in FIGURES 4 and 5; the forward chasing position is shown in FIGURE 5, while the retracted return stroke position is shown in FIGURE 4. These figures as well as FIGURE 8 show that the tool slide 48 moves forward and backward in ways 49 in the slideway 50 reciprocably toward and away from workpiece 28, and also that the slideway 50 is mounted for sliding lateral movement in a direction parallel to the axis of the workpiece 28 in the ways 52 of the guide base 53, as shown in FIGURES 3, 4, 5 and 8, facilitating the chasing and return strokes of the tool 32.

This unique combination, including cam actuated and synchronized tool indexing with positive spring-retraction and quick pneumatic tool return cooperate to achieve the high precision cycling provided by the present invention.

Figure 7:
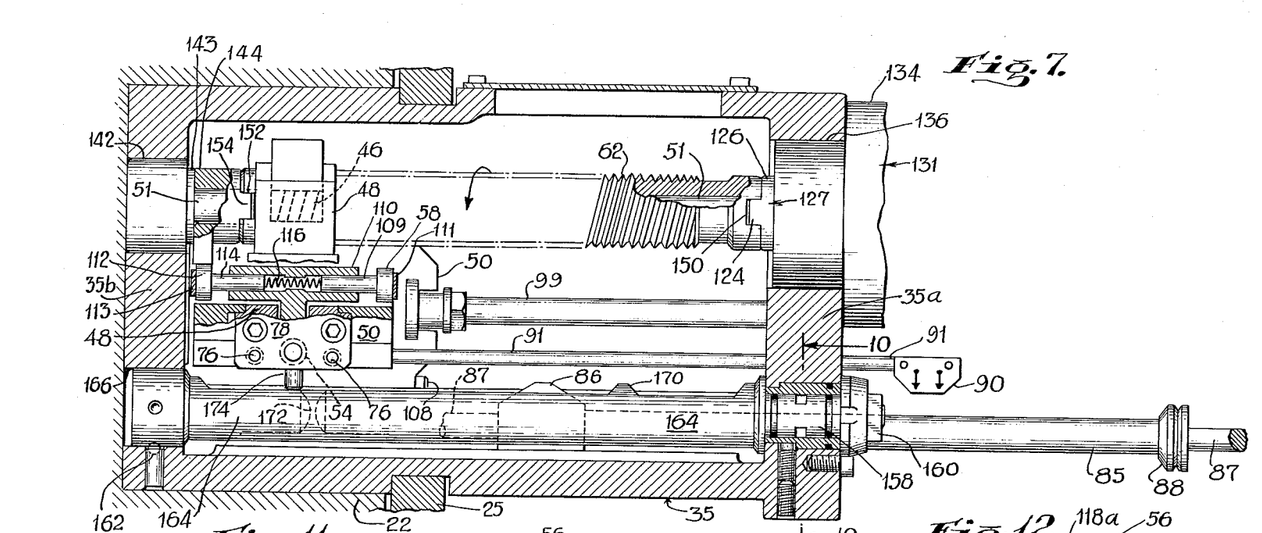
FIGURE 7 is a sectional elevation view similar to the view of FIGURE 6 showing the same thread chasing attachment converted for the cutting of a left-hand thread.

Furthermore, as illustrated in FIGURES 6 and 7, the withdrawal of lead screw 34 and the substitution of a different lead screw 62 of opposite hand, together with other changes, provides convenient conversion of the attachment for chasing threads of opposite hand.

The operating cycle of the chasing attachment is repeated continuously, and the structural elements which cooperate to move the chasing tool through this cycling path will now be described in detail, beginning with the parts which cooperate to produce the chasing stroke, from point A to point B.

*Mechanism producing the chasing stroke*

FIGURE 5 shows the tool slide 48 in its chasing position, with the tool 32 in cutting engagement with the rotating workpiece 28. In this indexed, chasing position of the tool slide 48, the lead screw nut segment 46 is likewise in its forward position, engaged with the continuously rotating lead screw 34 as shown in FIGURE 5.

The tool slide 48 is placed in this forward position, with the lead screw nut segment 46 in engagement with the lead screw 34 and the tool 32 engaging the workpiece 28, by operation of the latch cam 60 which has been depressed from its upper position shown in FIGURE 4 to its lower, engaged position shown in FIGURE 5, through the urging of the indexing cam 56 described in more detail below. The latch cam 60 pivots about a pin 64 mounted on the slideway 50 (see FIGURES 3, 4 and 5), and is urged clockwise in FIGURE 4 by a spring 65 on its pin 64. In this indexed position, the latch cam 60 presents an equal radius dwell portion 66 to the tool slide follower roller 61 rotatably mounted on the tool slide 48 (FIGURE 5). The point of contact 67 (FIGURE 5) between the dwell portion 66 of the latch cam 60 and the follower roller 61 is substantially aligned between the follower roller axis 70 and the axis of latch cam pivot pin 64, stabilizing the latch cam 60 and preventing its inadvertent release. Despite vibrations occurring during the chasing stroke, the static friction between follower roller 61 and its rotatable mounting on tool slide 48, and the downward pressure of spring 65 on latch cam 60 coact to maintain the latch cam 60 in its downwardly indexed position shown in FIGURE 5.

Whenever the latch cam 60 is pivoted out of this aligned position upwardly to the retracted position shown in FIGURE 4, it no longer urges follower 61 and tool slide 48 toward workpiece 28. The heavy compression coil spring 54 then positively urges the tool slide 48 rearwardly out of engagement with lead screw 34 and workpiece 28 with considerable force, moving it to the retracted position shown in FIGURE 4, where it remains until such time as the latch cam 60 is again depressed to overcome the urging of the heavy spring 54.

A pair of adjustable stop studs 74 (FIGURE 5) are mounted on the rear end of the slideway 50 flanking the heavy spring 54, and a corresponding pair of positive stop buttons 76 are mounted on a depending flange 78 of the tool slide 48, each in alignment respectively with one of the adjustable stop studs 74. Heavy spring 54 is interposed between slideway 50 and the depending flange 78 on tool slide 48, as shown in FIGURE 4.

Adjustment of the studs 74 determines the forward limit of sliding travel of the tool slide 48, and these studs are adjusted to bring the follower roller 61 into firm contact with the latch cam 60, and preferably to produce a slightly interfering fit between these two members, producing a jamming or wedging engagement therebetween and thus stabilizing latch cam 60 against inadvertent disengagement. This pressure between the latch cam 60 and its follower roller 61 will thus act to maintain the latch cam engaged with the follower roller throughout the chasing stroke regardless of vibrations of the chasing attachment during operation.

The adjustable stop studs 74 and the stop buttons 76 also coact to prevent forward "overtravel" of the tool slide 48 during the indexing action produced by the downward pivoting of the latch cam 60, which might cause gouging of the workpiece.

The latch cam remains in its downward engaged position as shown in FIGURE 5 throughout the chasing stroke, as the tool 32 moves from point A to point B in the rectangular diagram shown in FIGURES 2 and 3, with the lead screw 34 driving the tool supporting assembly 48–50 laterally on a path parallel to the axis of the workpiece 28 along the ways 52 in the guide base 53.

*Unlatching mechanism and retracting of the chasing tool*

A first trigger pin 80 having an enlarged shoulder 82 is movably mounted within enlarged hole 84 in the lower portion of the tool slideway 50. Throughout the chasing stroke, from point A to point B, trigger pin 80 is carried laterally along the traversing path of the assembly 48–50 above an elongated sleeve 85 (FIGURE 5), until the lower end of trigger pin 80 engages an upwardly sloping ramp on a protruding dog 86 (FIGURES 3, 4, 5 and 6) anchored to the inner end of the sleeve 85. The lateral positioning of sleeve 85 and its dog 86 is predetermined by the machine operator during the setting up of the chasing attachment 24.

The sleeve 85 is loosely and movably telescoped over a rod 87 (FIGURES 3–6). Sleeve 85 and rod 87 both extend through an aperture in the end wall 35a of the attachment casing 35 (FIGURES 6 and 9). The protruding outer end of sleeve 85 is formed as a knob 88 (FIGURES 6, 7). The integral assembly of elements 85, 86 and 88 is thus slidably mounted on the long rod 87, which is anchored in cantilever fashion in the remote end wall 35b of attachment casing 35, and the rod 87 thus extends concentrically through aligned central bores in dog 86, sleeve 85 and knob 88, and protrudes therefrom beneath the lead screw 34 in the direction of the splined drive shaft 36 (FIGURE 6).

A setscrew 89 mounted in knob 88 engages the rod 87 and locks the sleeve-dog-knob assembly 85–86–88 firmly in any preselected position on the rod 7. Thus the point of actuation of trigger pin 80 is changed by releasing setscrew 89, moving knob 88 to slide sleeve 85 along rod 87 to the desired new position, and resetting setscrew 89.

Coacting with this adjustable assembly is an indicator plate 90 bearing arrows or zero marks (FIGURES 6 and 7) supported by an indicator rod 91 slidably extending through another aperture in casing end wall 35a and anchored to the end of the laterally reciprocable slideway 50, as shown in FIGURES 6 and 7.

The position of the adjustable knob 88 relative to the indicator plate 90 indicates to the operator the position of dog 86 relative to the first trigger pin 80. Thus the lateral adjustment of the dog 86 by the adjusted positioning of the knob 88 determines the length of the chasing stroke from point A to point B in the cycle, in the following manner.

The constant-radius dwell region 66 of latch cam 60 has a lower end at a point 92, beneath which is a "fall" region 93 (FIGURE 4).

At the end of the chasing stroke, when the tool 32 has reached the point B, the lower end of the trigger pin 80 rides upward on the sloping ramp face of the dog 86, as indicated by the position of the tool slide-slideway assembly 48–50 shown in dot-dashed lines in FIGURE 6. The trigger pin 80 rises and the top of its shoulder 82 pushes the latch cam 60 upwardly, moving the point 92 between its constant-radius dwell region 66 and its fall region 93 past the line joining the two pivot pins 64 and 70, overcoming the downward pressure of spring 65. Thereupon, the action of the compressed heavy spring 54 quickly draws the tool slide 48 with its follower roller 61 toward the rising latch cam 60, with follower roller 61 riding under latch cam 60 and forcing it upward, pivoting about pin 64, toward the position shown in FIGURE 4. This retraction of tool slide 48 quickly withdraws the tool 32 from the workpiece 28 and simultaneously disengages the lead screw nut segment 46 from the lead screw 34. This rearward retraction movement continues until adjustable studs 94, protruding from the tool slide 48 away from the workpiece 28, come to rest against facing buttons 95 on slideway 50. Latch cam 60 then rests in the position shown in FIGURE 4, and is urged downwardly against follower 61 and held firmly in this position by torsion spring 65 on pin 64.

In this retracted position, as shown in FIGURE 4, the tool slide 48 and slideway 50 assembly is free to move laterally in the ways 52 formed in the guide base 53.

*Mechanism producing the return stroke*

Quick return of the tool slide 48 and slideway 50 from the retracted position C to the indexing position D is produced by the pneumatic return assembly 55 (FIGURES 8, 9 and 10) including a four-way valve 96 encased in casing end wall 35a, cooperating with a cylinder 97 anchored to casing end wall 35a. The cylinder 97 encloses a piston 98 integrally joined with the tool slideway 50 by a piston rod 99 extending through a suitable aperture in end wall 35a, as shown in FIGURE 8. During the chasing stroke, from the position A shown in FIGURE 8 to the position B, the slideway 50 moves from the left end to the right end of the ways 52, as viewed from the vicinity of workpiece 28 in FIGURE 8.

With the four-way valve 96 set as shown in FIGURE 9, cooperating with the right-hand lead screw 34, the end of cylinder 97 nearest the chasing attachment is connected through an adjacent port 100 and conduit 101 and four-way valve 96 to an accumulator line 102, as shown in FIGURES 8 and 9. The remote end 103 of the cylinder 97 is open to the atmosphere through the remote port 104, a conduit 105, the some four-way valve 96 and the vent port 106. Lateral traverse of slideway 50 from point A to point B during the chasing stroke thus exhausts the near end of cylinder 97 into an accumulator 107, connected to the accumulator line 102.

Air pressure in the accumulator 107 connected by line 102, valve 96 and conduit 101 to the port 100 at the near end of cylinder 97 is roughly 15 p.s.i.g., and this pressure applied against the near face of piston 98 is easily overcome by the driving force of the lead screw 34 and the nut segment 46, whose engagement drives the tool slide 48 and the slideway 50 laterally down the length of the workpiece 28 throughout the chasing stroke. Upon retraction of the nut segment 46 from the lead screw 34, however, the pressure in the accumulator line 102 on the near side of piston 98 is opposed only by atmospheric pressure on the remote side of the piston 98. This pressure differential produces an immediate return stroke of the piston 98 down the length of the pneumatic cylinder 97, drawing with it the integrally joined tool slideway 50 carrying the tool slide 48 still in its retracted rearward position as shown in FIGURE 4.

As the piston 98 reaches the end of its return stroke in the pneumatic cylinder 97, approaching the position shown in FIGURE 8, it covers the remote port 104 and traps the remaining air in the remote end 103 of cylinder 97 to produce a cushioning effect, which provides for slowing the return stroke of the piston 96 with dashpot action and thus cushioning the end of the return movement of the tool slide 48 and slideway 50 assembly, until it reaches the index cam 56 in the position D shown in FIGURE 8, with buttons 108 on the cylinder end of slideway 50 resting on bumper studs 108a aligned therewith and protruding inwardly from the facing inner side of end wall 35a of casing 35, it being understood of course that the pneumatic pressure in the near end of the cylinder 97 remains greater than the cushioning pressure in the far end of the cylinder 97 to hold the slideway buttons 108 in engagement with the bumper studs 108a. The slideway 50 is thus brought to the position required for forward indexing movement of the tool slide 48, to bring the nut segment 46 into driving engagement with the lead screw 34, and the chasing tool 32 into cutting engagement with workpiece 28.

*The indexing mechanism*

Figure 11:
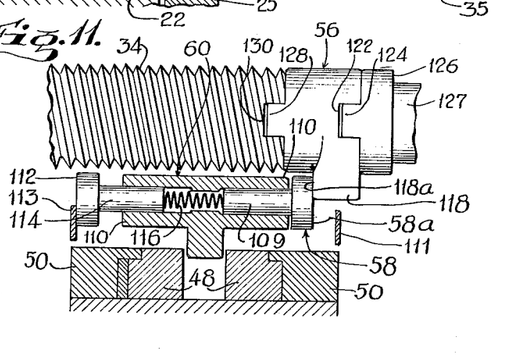
FIGURES 11 and 12 are enlarged fragmentary elevation views of part of the mechanism shown in FIGURE 6, showing the indexing cam operating at the end of the return stroke to urge the thread chasing tool into engagement with the workpiece at the beginning of each cutting stroke; these views show successive stages in the operation of the indexing cam and its follower roller.

As the tool slide 50 reaches the end of its return stroke, as described above and shown in FIGURE 8, it carries with it the pivoted latch cam 60 which has the follower roller 58 rotatably mounted therein about an axis generally parallel to the axis of the lead screw 34 and indexing cam 56, as shown in FIGURES 3–7, 11 and 12. As best seen in FIGURE 11, the follower roller 58 has a stem 109 rotatably and slidably contained in the latch cam sleeve 110. A retainer bar 111 mounted on slideway 50 spans the exposed end of follower 58, blocking its removal from sleeve 110. A second latch cam follower roller 112 is rotatably and slidably mounted in the opposite end of the sleeve 110 and a retainer bar 113 similar to bar 111 likewise blocks the removal of follower roller 112 from sleeve 110. Follower roller 112 has a stem 114 telescopingly fitted within sleeve 110, with a compression coil spring 116 being positioned in the sleeve 110, compressed between the two facing ends of the follower stems 109 and 114.

Figure 12:
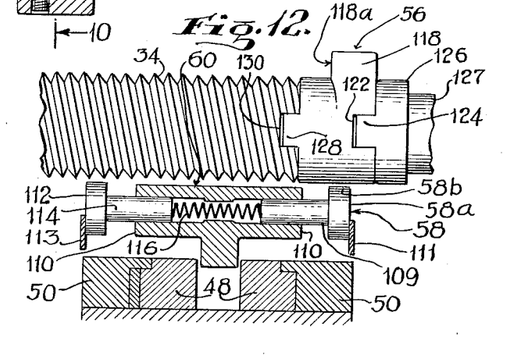

As shown in FIGURE 12, the coil spring 116 is normally under slight compression, resiliently biasing the follower rollers 58 and 112 respectively apart toward retainer bars 111 and 113 spanning their exposed ends and mounted on the slideway 50.

As the slideway 50 carrying the tool slide 48 reaches the end of its return stroke produced by the operation of the piston 98 in cylinder 97, the latch cam follower roller 58 arrives under the indexing cam 56, having an indexing peak 118. This ready position of roller 58 is shown in dashed lines in FIGURE 3; see also FIGURES 6 and 12. If the indexing peak 118 of the indexing cam 56 is protruding in the return path of the follower roller 58, as shown in FIGURE 11, the end face 58a of the follower roller 58 will contact the side face 118a of the indexing peak 118 of cam 56 as shown in FIGURE 11, telescoping the stem 109 within sleeve 110 and further compressing the spring 116. As cam 56 continues its rotation, peak 118 swings out of engagement with roller 58, and spring 116 urges roller 58 to the position shown in FIGURE 12. If follower roller 58 arrives when the indexing peak 118 is not interposed, but is rotated in another radial position of the index cam 56, the follower roller 58 will move directly into lateral juxtaposition with the body of the indexing cam 56, with its peripheral face 58b facing peak 118 on the rotating indexing cam 56 (FIGURE 12), as the slideway 50 reaches the end of its return stroke.

As the next revolution of the indexing cam 56 brings the indexing peak 118 into juxtaposition and camming engagement with the follower roller 58, FIGURES 5 and 6, the roller rides on a rise portion 119 of the cam peak 18, thus urging the latch cam 60 to pivot downward about its pivot pin 64, which anchors it pivotally on the slideway 50. This downward rotation of the index cam 60 moves it from its upper position shown in FIGURE 4 to its lower engaged position shown in FIGURE 5, indexing the cutting tool 32 forwardly into engagement with workpiece 28 in the manner explained previously.

During each chasing cycle, the continuous in-feed movement of cross slide 22 carries it toward workpiece 28 by a small amount, 0.002 inch in the illustrated embodiment. Since the chasing stroke occurs during the continuous in-feed movement, the thread chased on workpiece 28 has a resulting slight taper, which is removed by one or more "clean up passes" of the chasing tool 32 occurring during a final dwell in the feed cycle of the cross slide 22.

*Synchronization*

As shown in FIGURE 6, both lead screw 34 and cam 56 are provided with aligned central bores, permitting both of these parts to be successively telescopingly mounted on the rotating index shaft 51, laterally spanning the attachment casing 35.

In order to drive the chasing tool along coinciding cutting paths during all successive chasing strokes, the angular position of the lead screw 34 is synchronized directly with the angular position of the workpiece 28 throughout their respective rotations; they are both driven by the same gear train continuously, and any backlash has been absorbed at the start of the driving operation of the gear train.

Sychronization of the downward latching movement of the latch cam 60 with a predetermined angular position of the lead screw 34 is essential to produce the forward indexing movement of the chasing tool 32 in exact alignment with the thread being chased in the workpiece 28. This desired synchronization of indexing advance of the chasing tool 32 from the returned ready position D to the indexed chasing position A is produced by the predetermined angular relationship between the rise 119 of the indexing peak 118 on the index cam 56 (FIGURES 3, 4, 5) relative to a transverse keyway 122 (FIGURE 6) cut diametrically across the driven face of the cam 56 and engaging a corresponding diametric key 124 machined in the driving face of the hub 126 on the stub shaft 127. Index cam 56 is also provided with a similar diametric key 128 formed in its opposite or driving face which interfits with a corresponding keyway 130 formed across the driven end face of the lead screw 34 (FIGURE 6).

Shaft 51 is concentrically threaded into the shoulder end 126 of the stub shaft 127 drivingly secured by one of the universal joints 38 to the splined drive shaft 36 (FIGURES 2 and 6). The interlocked keying of the stub shaft 127, the cam 56 and the lead screw 34 transmits the rotary driving torque carried by the splined drive shaft 36 through the stub shaft 127 and directly to the indexing cam 56 and the lead screw 34, producing their continuous and integral rotation.

Thus the driving engagement of the drive shaft 36, the stub shaft 127, the index cam 56 and the lead screw 34 through the keys 124 and 128 in their corresponding keyways provides the desired phase synchronization of the indexing latching operation, because latch cam 60 is urged downward by the indexing peak 118 on cam 56 at the same predetermined angular position in the rotation of the lead screw 34 and the workpiece 28, to begin each successive chasing stroke. Each chasing stroke is thus accurately synchronized, producing the desired high precision and accuracy of the resulting work. The accurately machined lead screw 34 maintains and assures the helical accuracy of the resulting thread with far greater precision than prior "lead-cam" guided chasing mechanisms. At the same time the retracting, quick return and precision indexing features of the present invention provide the important advantages of high speed continuous operation coupled with high reliability.

The tool retracting and tool return operations are independent of the rotating synchronized lead screw 34 and workpiece 28, thus saving time during the non-cutting portions of the operating cycle. The chasing stroke provides for removing a fine depth of cut down the entire length of the workpiece thread and at a linear rate dependent upon the rotational speed and thread pitch of the lead screw 34. The chasing tool can then be retracted and rapidly returned and indexed for the next cutting stroke. Thus the entire chasing operation on a workpiece may be completed rapidly and effectively, although it may comprise fifty or more complete operating cycles of the chasing attachment 24.

*Conversion for chasing threads of opposite pitch lead screw and index cam conversion*

The chasing attachments of the present invention are conveniently changed over to produce threads of opposite hand in the workpiece 28 through the substitution of the lead screw 62 of opposite hand (FIGURE 7) for the lead screw 34 shown in the figures. Thus the right-hand lead screw 34 shown in FIGURE 6 may be removed, the left-hand lead screw 62 and associated parts may be installed, and the position of the four-way valve 96 may be changed, all as shown in FIGURE 7, to complete the conversion of these attachments for the chasing of threads of opposite hand.

The removal of lead screw 34 is accomplished by disconnecting and withdrawing the bearing block assembly 131 shown in FIGURES 6 and 9, and with it the stub shaft 127, the attached index shaft 51, and the lead screw 34 and indexing cam 56 carried thereon.

To make this conversion, the screws 132 (FIGURE 9) anchoring a bearing block 134 to the casing wall 35a are removed after disconnecting the splined drive shaft 36, and the bearing block 134 is then removed, carrying with it the stub shaft 127, the index shaft 51, the lead screw 34 and the indexing cam 56, all integrally joined together. This removal is made by withdrawal of the bearing block 134 and its associated elements through the bearing block aperture 136 indicated in FIGURES 6 and 7.

The driven end of the index shaft 51 is secured by a left-hand thread 138 (FIGURE 6) in a corresponding central concentric threaded hole 140 in the driving end of the stub shaft 127, rotatably supported in suitable bearings in the bearing block 134. The remote end of the index shaft 51 is mounted in a roller bearing 142 (FIGURE 6) recessed in the remote end wall 35b of casing 35, shown at the left side of FIGURE 6, and an enlarged shoulder 143 formed on the end of index shaft 51 forms the inner race of the bearing 142, and is axially removable therefrom for convenient sliding axial withdrawal of shaft 51 and the associated removable elements.

Unthreading disengagement of the index shaft 51 from the stub shaft 127 releases the tubular right-hand lead screw 34 and the right-hand index cam 56, whose central bores allow them to be slipped telescopingly from the index shaft 51.

A left-hand index cam 144 and the left-hand lead screw 62 are then telescopingly mounted on the index shaft 51, with the cam 144 positioned at the remote or left end of shaft 51 as shown in FIGURE 7, and the shaft 51 is again threadedly engaged in hole 140 in the stub shaft 127. Torque required for the threaded engagement and disengagement of shafts 51 and 127 is supplied to the index shaft 51 through a hexagonal socket 148 (FIGURE 6) formed in the end face of shoulder 143 of index shaft 51 and accommodating an Allen wrench.

As shown in FIGURE 7, the left-hand lead screw 62 is provided at its driven end with a transverse keyway 150 which engages the key 124 on the stub shaft 127. At its opposite or driving end, the left-hand lead screw 62 is provided with a similar transverse keyway 152 engaging a corresponding transverse key 154 formed in the driven face of the left-hand indexing cam 144. These interlocking keys and keyways 124, 150, 152 and 154 thus assure the synchronized driving engagement of the workpiece and the lead screw driving the chasing tool.

Each lead screw and its corresponding index cam are firmly clamped between the driving key 124 of hub shoulder 126 on stub shaft 127, and the corresponding enlarged shoulder 143, formed on the remote end of the index shaft 51, which is journaled in and slidably removable from the roller bearing 142, as shown in FIGURE 6.

The following re-assembly steps are required to complete the conversion. The left-hand lead screw 62, index cam 144, and bearing block assembly 131 are reinserted through the bearing block aperture 136, with the shoulder 143 again journaled within the rollers of roller bearing 142. The screws 132 are reinstalled, and a left-hand lead screw nut segment and a left-hand threaded chasing tool (not shown) are mounted on tool slide 48. The chasing attachment 24 is then adapted to drive the new chasing tool along its chasing stroke in the opposite direction, to chase the thread of a left-hand threaded workpiece 28. The chasing cycle then operates "clockwise" and follows the rectangle BADC in FIGURE 2.

In the illustrated embodiments the reduction gear box 40 provides 2:1 speed reduction, causing lead screw 34 to rotate at half the velocity of workpiece 28. Thus the pitch of lead screw 34 is twice the pitch produced in the finished work. This permits the use of a heavy, rugged lead screw thread having good wear characteristics while the attachment nevertheless chases a fine pitch thread on the workpiece with high accuracy and precision.

*Automatic return mechanism conversion*

To convert the pneumatic return mechanism to produce "left-hand" return motion from point D to point C, setscrew 89 is released, and knob 88 is moved along rod 87 to bring the dog 86 to the desired release position, shown in FIGURE 7, determining the point in the chasing stroke at which the first trigger pin 80 will be moved upward by engagement with the sloping ramp on dog 86.

The air and venting connections to the pneumatic cylinder 97 are also reversed by rotation of a valve stem 158 of the four-way valve 96 from a right-hand position shown in FIGURES 5, 6 and 9 to a left-hand position shown in FIGURES 7 and 10; the valve stem 158 is turned with a wrench placed on its square head 160 protruding from wall 35a of casing 35 (FIGURES 6 and 7), and is held in one of its two positions by detent 162 in casing wall 35b, acting on an elongated rod portion 164 of the valve stem 158, as shown in FIGURE 6.

In FIGURES 8 and 9, with the right-hand setting of valve stem 158, the accumulator line 102 is shown connected to the adjacent cylinder port 100 through the valve 96 and conduit 101, while the remote port 104 of pneumatic cylinder 97 is vented to the atmosphere through conduit 105, valve 96 and the vent port 106, both of these connections being made by the valve 96 in the right-hand valve mode illustrated in FIGURE 9.

When the four-way valve stem 158 is rotated to the left-hand mode, FIGURE 10, the remote end 103 of the pneumatic cylinder 97 is opened to the accumulator line 102 through the port 104, conduit 105 and valve 96, while the near end of cylinder 97 is vented to the atmosphere through the port 100, conduit 101, valve 96 and exhaust port 106.

As shown in FIGURES 6 and 7, the four-way valve stem 158 is provided with the elongated rod portion 164 extending through casing wall 35a and across the lower portion of the casing 35. Rod 164 has its remote end journaled in the opposite casing wall 35b in a journal 166, which incorporates the detent 162 holding rod portion 164 of the valve stem 158 alternatively in one of its two positions, shown respectively in FIGURES 9 and 10. The elongated rod portion 164 of the valve stem 158 is provided with two radial protruding dogs, a left-hand limit dog 170 and a right-hand limit dog 172. The quarter turn rotation of the valve stem rod 164 brings one or the other of these limit dogs into alignment with a second trigger pin 174, FIGURE 5. The right-hand limit dog 172 is shown protruding upward from the rod portion 164 in FIGURES 4, 5 and 6, and the left-hand limit dog 170 is shown protruding upward from the rod portion 164 in the left-hand mode conversion of the chasing attachment shown in FIGURE 7.

Each of these limit dogs performs the function of limiting the chasing stroke of the tool slide 48 in slideway 50 by causing disengagement of nut segment 46 from the lead screw at a remote predetermined position to prevent over-travel of these laterally-driven moving elements. This limiting disengagement is produced by the second trigger pin 174, which is generally similar to the first trigger pin 80 and is mounted in a similar trigger pin hole 176 in tool slide 50, likewise positioned under the latch cam 60. Lateral movement of the slideway 50 caused by the driving engagement of nut segment 46 with the lead screw 34 finally brings the second trigger pin 174 into engagement with the appropriate limit dog 170 or 172, and slight further lateral movement of the slideway 50 causes the trigger pin 174 to ride up the slanting face of the limit dog, urging the latch cam 60 upward, causing it to move from its engaged position shown in FIGURE 5 to its disengaged position shown in FIGURE 4, because the coil spring 54 quickly retracts the tool slide 48 in the slideway 50, simultaneously disengaging the nut segment 46 from the lead screw 34 and the tool 32 from the workpiece 28.

Thus, if the predetermined end of cut established by the adjustable dog 86 is not properly set, one of the limit dogs 170 or 172 will automatically cause disengagement and limit the lateral traversing of the tool carrying assembly 48–50 at the extreme end of its operating stroke, preparing it for automatic return to begin another chasing cycle.

Similar automatic retraction of tool 32 occurs if the valve stem 158 is improperly positioned in some angular orientation other than one of its two detent positions, connecting pneumatic cylinder 97 for tool-return actuation. This automatic retraction is produced by the shape of the rod 164, which has peripheral segments cut away flanking each of the protruding dogs 170 and 172, leaving a nearly full-radius corner edge 178 between adjacent segments, as shown in FIGURES 4 and 5. These drawings show one of the cut away segments centered beneath second trigger pin 174, aligning dog 172 therewith. If the nearly full-radius corner edge 178 or part of the remaining full radius periphery of rod 164 is uppermost, its juxtaposition will raise pin 174, unseating latch cam 60 by pivoting it about its pin 64, and thus keeping tool 32 in its retracted position, disengaged from workpiece 28, by the action of spring 54 until valve stem 158 is set for making pneumatic return stroke connections. This provides an automatic fail-safe feature whereby the chasing operation cannot be performed until the pneumatic cylinder 97 is properly connected to the accumulator line 102 and to the atmosphere.

If the valve stem 158 is left in the wrong position following conversion of the attachment from the right-hand mode to left-hand mode of vice versa, one of the limit dogs 170 or 172 will similarly coact with trigger pin 80 to unlatch the latch cam 60, disengaging the tool-carrying assembly 48–50, and the reversed connection to the pneumatic cylinder 97 will prevent return of the tool carrying assembly 48–50 to repeat the chasing operation. Therefore, the automatic operating cycle of the chasing attachment will be interrupted, and it will not resume until the valve stem 158 is placed in the valve position which corresponds to the lead screw and index cam installed in the chasing attachment.

In order to balance the pressure load on the piston 98 in both right-hand and left-hand operating modes, a remote piston rod 180 extends from the remote side of the piston 98 and the rod 180 telescopes into and oscillates within a remote, empty cylinder 182 adjoining the pneumatic cylinder 97.

Wear in the ways 52 formed in guide base 53 is counteracted by adjustment of a taper gib 184 (FIGURES 4, 8) forming the upper member of the ways 52 and slidably mounted on the guide base 53. An adjusting screw 186 threaded into casing 35 (shown in the upper portion of FIGURE 8) is provided with an enlarged shoulder flange 188 engaging a notch 190 in the taper gib 184. Turning the screw 186 advances shoulder 188 axially, with corresponding advance of taper gib 184.

A similar taper gib 192 is mounted in slideway 50, forming one side of the ways 49 slidably accommodating tool slide 48, as shown in FIGURES 3, 6 and 8. Adjustable taper gibs 184 and 192 provide enhanced accuracy of the chasing tool's stroke and indexing movement over an extended useful life of the chasing attachment. The life of the mechanism is further extended by continuous drip lubrication of all sliding parts by way of conduits (not shown) in casing 35, gib 184, slideway 50 and tool slide 48.

The high-speed automatic chasing attachments of this invention thus achieve high precision and accuracy in chasing threaded portions of workpieces. The chasing operation is performed automatically and continuously, with repeated fine chasing cuts being made at high speed and with excellent synchronization, producing accurate and finely finished threads. These chasing attachments are readily convertible for producing either right-hand or left-hand threads. The foolproof features of their construction prevent inadvertent damage to workpieces or equipment. Furthermore, their spring retraction and pneumatic return mechanisms enhance their speed and dependability while minimizing their cost.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense. Many variations in the specific structure shown may be made within the scope of the invention. For example, hydraulic means may be employed for the rapid return of the chasing tool in lieu of the pneumatic means as disclosed herein.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

In the claims:

1. In a tool chasing device providing for longitudinally advancing a tool along a traversal stroke along a rotating workpiece, for laterally withdrawing the tool from the workpiece and for longitudinally retracting and laterally extending the tool to initiate a successive traversal stroke and including a frame, a tool support, means for supporting the tool support on the frame for longitudinal reciprocable movement for providing the traversal stroke and for lateral reciprocable movement between an extended position for positioning a tool in operative engagement with the workpiece and a withdrawn position for disengaging the tool from the workpiece, a longitudinally extending lead screw mounted on the frame for rotation in synchronization with the rotating workpiece, means engaging the lead screw with the tool support in its laterally extended position for longitudinally advancing the tool support by the lead screw and disengaged from the lead screw with the tool support in its laterally withdrawn position, control means for actuating the tool support laterally to its extended position and to its withdrawn position at the ends respectively of the traversal stroke, and drive means for longitudinally retracting the tool support with the tool support in its withdrawn position, the improvement wherein the drive means comprises a fluid motor having a cylinder with an operating chamber and a piston reciprocable in the operating chamber operatively connected for longitudinal displacement of the tool support, a fluid pressure source, and conduit means including valve means operable for selectively connecting the ends of the operating chamber to the fluid pressure source for selectively controlling the longitudinal direction of displacement of the tool support by the fluid motor, further comprising mounting means for detachably mounting the lead screw on the frame to provide for selectively mounting an appropriate lead screw for longitudinally advancing the tool support in a selective longitudinal direction, and wherein the control means is selective to effect lateral extension and withdrawal of the support at alternate ends respectively of the traversal stroke, whereby the longitudinal direction of the traversal stroke may be selected by selective installation of an appropriate lead screw, by selective connection of the opposite ends of the operating chamber to the fluid pressure source with the valve means, and by selection of the ends of the traversal stroke for lateral extension and withdrawal of the tool support respectively with the control means.

2. The improvement of claim 1 wherein the control means includes a control cam mounted coaxially with the lead screw adjacent one end thereof for effecting extension of the tool support in synchronization with the rotating workpiece, and wherein the mounting means provides for selectively mounting a control cam adjacent either end of the lead screw dependent upon the longitudinal direction of the traversal stroke.

3. In a tool cycling device providing for longitudinally advancing a tool along a traversal stroke along a rotating workpiece, for laterally withdrawing the tool from the workpiece and for longitudinally retracting and laterally extending the tool to initiate a successive traversal stroke and including a frame, a tool support, means supporting the tool support on the frame for longitudinal reciprocable movement for providing the traversal stroke and for lateral reciprocable movement between an extended position for positioning a tool in operative engagement with the workpiece and a withdrawn position for disengaging the tool from the workpiece, a longitudinally extending lead screw mounted on the frame for rotation with the rotating workpiece, means engaging the lead screw with the tool support in its extended position for longitudinally advancing the tool support by the lead screw and disengaged from the lead screw with the tool support in its laterally withdrawn position, control means for actuating the tool support laterally to its extended position and to its withdrawn position at the ends respectively of the traversal stroke including a latch mounted for movement between a withdrawn inoperative position and an operative position for actuating the tool support to its extended position, a control cam operatively connected with the lead screw for actuating the latch to its operative position, and drive means for longitudinally retracting the tool support with the tool support in its withdrawn position, the improvement wherein the drive means comprises a fluid motor having a cylinder with an operating chamber and a piston reciprocable in the operating chamber operatively connected for longitudinal displacement of the tool support by the fluid motor, a fluid pressure source, conduit means including valve means operable for selectively connecting the ends of the operating chamber to the fluid pressure source for selectively controlling the longitudinal direction of displacement of the tool support by the fluid motor, limiter means rotatably mounted on the frame about an axis parallel to the axis of the lead screw, said limiter means having a pair of axially spaced and angularly offset dogs adapted to be alternatively rotated to an operative angular position for effecting reciprocable movement of the latch means to its withdrawn position to provide longitudinal terminal limits for traversal strokes in opposite longitudinal directions respectvely, and means for operatively connecting the valve means and the limiter means for selectively rotating the dogs in said angular position in cooperation with the selection of the direction of the displacement of the tool support with the valve means.

4. The improvement of claim 3 wherein the valve means is a manually operable rotary valve in coaxial relationship with the rotary limiter means and directly connected thereto.

5. In a tool cycling device providing for longitudinally advancing a tool along a traversal stroke along a rotating workpiece, for laterally withdrawing the tool from the workpiece and for longitudinally retracting and laterally extending the tool to initiate a successive traversal stroke and including a frame, tool support, means supporting the tool support on the frame for longitudinal reciprocable movement for providing the traversal stroke and for lateral reciprocable movement between an extended position for positioning a tool in operative engagement with the workpiece and a withdrawn position for disengaging the tool from the workpiece, a longtudinally extending lead screw mounted on the frame for rotation with the rotating workpiece, means engaging the lead screw with the tool support in its extended position for longitudinally advancing the tool support by the lead screw and disengaged from the lead screw with the tool support in its laterally withdrawn position, control means for actuating the tool support laterally to its extended position and to its withdrawn position at the ends respectively of the traversal stroke, the improvement wherein the drive means comprises a pneumatic motor having a cylinder with an elongated operating chamber and a piston axially reciprocable in the operating chamber operatively connected for longitudinal displacement of the tool support with the pneumatic motor, an air pressure source, and conduit means including valve means operable for selectively connecting the ends of the operating chamber to the air pressure source and to exhaust respectively for selectively controlling the direction of displacement of the tool support by the pneumatic motor, said conduit means being connected to the cylinder at points spaced inwardly of the axial ends of the operating chamber to provide cushion chamber portions at the ends thereof for cushioning the piston, wherein the control means is selective to effect lateral extension and withdrawal of the tool support at alternate ends respectively of the traversal stroke, and further comprising mounting means for detachably mounting the lead screw on the frame to provide for selectively mounting an appropriate lead screw for longitudinally advancing the tool support in a selective longitudinal direction, whereby the longitudinal direction of the traversal stroke may be selected by selective connection of the opposite ends of the operating chamber to the fluid pressure source with the valve means by selective installation of an appropriate lead screw, and by selection of the alternate ends of the traversal stroke for lateral extension and withdrawal of the tool support respectively with the control means.

6. In a tool chasing device providing for longitudinally advancing a tool along a traversal stroke along a rotating workpiece, for laterally withdrawing the tool from the workpiece, and for longitudinally retracting and laterally extending the tool to initiate a successive traversal stroke and including a frame, a tool support, means for supporting the tool support on the frame for longitudinal reciprocable movement for providing the traversal stroke and for lateral reciprocable movement between an extended position for positioning a tool in operative engagement with the workpiece and a withdrawn position for disengaging the tool from the workpiece, a longitudinally extending lead screw mounted on the frame for rotation in synchronization with the rotating workpiece, means engaging the lead screw with the tool support in its laterally extended position for longitudinally advancing the tool support by the lead screw and disengaged from the lead screw with the tool support in its laterally withdrawn position, control means for actuating the tool support laterally to its extended position and to its withdrawn position at the ends respectively of the traversal stroke, control means including a latch mounted on the carriage for operation between a withdrawn inoperative position and an operative position for actuating the tool support to its extended position, a control cam operatively connected with the lead screw for actuating the latch to its operative position, and cam follower means on the latch having an operative position engageable by the control cam for camming the latch to its operative position, the improvement wherein the cam follower means comprises a cam follower mounted on the latch for longitudinal reciprocable movement in the direction of the traversal stroke from an extended operative position engageable by the control cam for camming the latch to its operative position to a withdrawn inoperative position and spring means urging the cam follower to its extended operative position.

7. The improvement of claim 6 wherein the control cam is mounted coaxially with the lead screw at adjacent an axial end thereof, wherein the cam follower means comprises a pair of longitudinally spaced cam followers mounted on the latch for longitudinal reciprocable movement between operative positions engagable by the control cam to extend the latch and inoperative positions, and spring means urging the cam followers to their operative positions, and further comprising means for detachably mounting the lead screw and the control cam to provide for selectively mounting an appropriate lead screw for longitudinally advancing the tool support in a selective longitudinal direction and for selectively mounting the control cam at adjacent either end of the lead screw for engagement with the pair of longitudinally spaced cam followers respectively.

8. In a tool chasing device providing for longitudinally advancing a tool along a traversal stroke along a rotating workpiece, for laterally withdrawing the tool from the workpiece and for longitudinally retracting and laterally extending the tool to initiate a successive traversal stroke and including a frame, a tool support, means for supporting the tool support on the frame for longitudinal reciprocable movement between an extended position for positioning a tool in operative engagement with the workpiece and a withdrawn position for disengaging the tool from the workpiece, a longitudinally extending lead screw mounted on the frame for rotation in synchronization with the rotating workpiece, means engaging the lead screw with the tool support in its laterally extending position for longitudinally advancing the tool support by the lead screw and disengaged from the lead screw with the tool support in its laterally withdrawn position, control means for actuating the tool support laterally to its extended position at the beginning of the traversal stroke and for laterally withdrawing the tool support at the end of the traversal stroke including a latch mounted for operation between a withdrawn inoperative position and an extended operative position for actuating the tool support to its extended position, and a control cam operatively connected with the lead screw for actuating the latch to its operative position, the improvement wherein the latch is pivotally mounted about a longitudinally extending axis for operation between a pivotally extended operative position and a pivotally withdrawn inoperative position, further comprising a roller engageable by the latch rotatably mounted on the tool support for rotation about a longitudinally extending axis, and wherein the latch has a peripheral edge engageable with the roller including a constant radius dwell portion engageable with the roller in the operative pivotal position of the latch for retaining the tool support in its extended position and a camming portion engageable with the roller upon pivotal movement of the latch to its operative position to cam the tool support to its extended position.

References Cited by the Examiner

UNITED STATES PATENTS

| | | | |
|---|---|---|---|
| 781,148 | 1/05 | Kennedy | 91—408 |
| 2,084,898 | 6/37 | Eckardt et al. | 82—5.5 |
| 2,143,794 | 1/39 | Ogilvie | 82—5 |
| 2,248,692 | 7/41 | Adcock | 82—5 |
| 2,265,265 | 12/41 | Castelli | 82—5 X |
| 2,882,776 | 4/59 | Jeanneret | 82—5 |
| 3,087,365 | 4/63 | Rose et al. | 82—5 |
| 3,120,157 | 2/64 | Mello | 91—408 |

WILLIAM W. DYER, Jr., *Primary Examiner.*

LEON PEAR, *Examiner.*